UNITED STATES PATENT OFFICE.

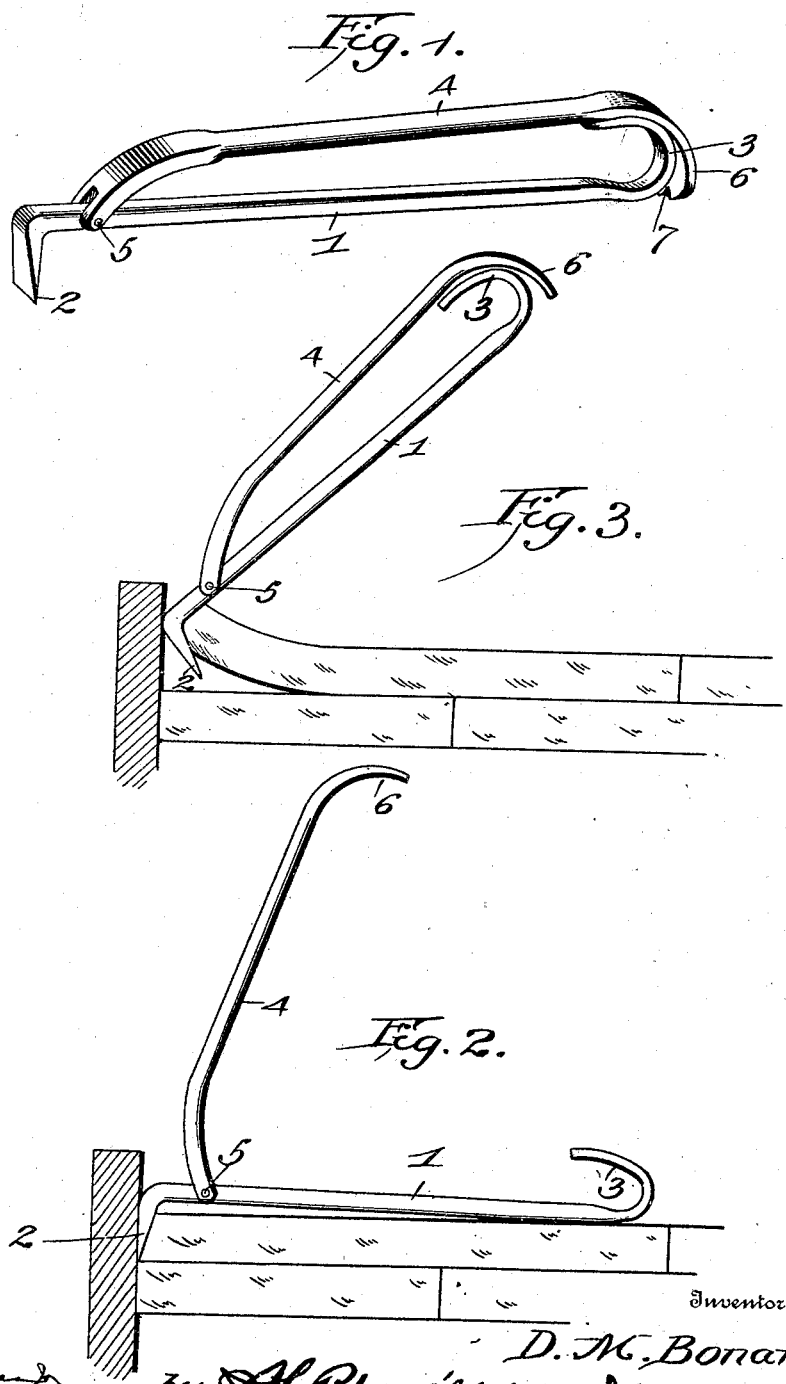

DAVID M. BONAR, OF PLAINVIEW, OREGON.

PLUG-TOBACCO PRIER.

SPECIFICATION forming part of Letters Patent No. 638,087, dated November 28, 1899.

Application filed May 2, 1899. Serial No. 715,325. (No model.)

*To all whom it may concern:*

Be it known that I, DAVID M. BONAR, a citizen of the United States, residing at Plainview, in the county of Linn and State of Oregon, have invented certain new and useful Improvements in Plug-Tobacco Priers; and I do declare the following to be a full, clear, and exact description of the invention, such as will enable others skilled in the art to which it appertains to make and use the same.

My invention relates to a novel form of pry for removing plug-tobacco from the boxes or butts in which it is packed for market; and the object is to provide a simple, convenient, and effective device of this character.

To this end the invention consists in certain features of construction and combination of parts, which will be hereinafter more fully described and claimed.

In the accompanying drawings the same reference characters indicate the same parts of the invention.

Figure 1 is a perspective view of my improved tobacco-pry. Fig. 2 shows the manner of inserting the pry, and Fig. 3 shows the manner of removing a plug.

1 denotes a hand-lever having its forward end formed with a right-angular chisel-pointed dog 2 and its opposite end formed with a C-shaped loop 3, which forms a grip for the middle finger in using the pry.

4 denotes a handle bifurcated at its forward end to straddle the lever 1, to which it is pivoted by the rivet 5. The free end 6 of the handle is broadened, flattened, and turned inwardly to encompass the grip-loop 3, and its end terminates in a claw 7 to remove tacks and wire nails from the tobacco-boxes.

In using the pry the dog 2 is inserted between the side of the box and the end of the plug, and this operation is conveniently done by placing the lever 1 parallel with the plug of tobacco and extending the handle 4 at a right angle to the lever, as shown in Fig. 2, and by pressure applied to the handle the dog is forced down between the end of this plug and the contiguous side of the box. The handle is now closed down parallel with the lever, and the middle finger is inserted in the loop 3, and the free ends of the lever and handle drawn outwardly to pry or lift the end of the plug and remove it, as shown in Fig. 3.

The accompanying drawings show my invention in the best form now known to me; but many changes in the details might be made within the skill of a good mechanic without departing from the spirit of my invention as set forth in the claims at the end of this specification.

Having thus fully described my invention, what I claim, and desire to secure by Letters Patent, is—

1. A tobacco-prier comprising a rigid shank having a pointed dog at one end that extends at an angle as great as a right angle to the length of the shank and provided with a straight outer face, and a handle pivoted to said shank at a point contiguous to said dog, substantially as and for the purpose set forth.

2. A tobacco-prier comprising a rigid shank having a pointed dog at one end that extends at an angle as great as a right angle to the length of the shank and provided with a straight outer face, and a handle pivoted to said shank at a point contiguous to said dog, said handle being provided with a broadened grasping extremity, substantially as and for the purpose set forth.

In testimony whereof I have hereunto set my hand in presence of two subscribing witnesses.

D. M. BONAR.

Witnesses:
J. R. DAVIS,
A. B. WILMOT.